United States Patent [19]
Airas et al.

[11] Patent Number: 5,912,028
[45] Date of Patent: *Jun. 15, 1999

[54] APPARATUS FOR MOULDING PLASTIC PRODUCTS

[75] Inventors: Risto Airas, Helsinki; Mika Eilomaa; Timo Tirronen, both of Espoo, all of Finland

[73] Assignee: Fibox Oy AB, Jorvas, Finland

[ * ] Notice: This patent issued on a continued prosecution application filed under 37 CFR 1.53(d), and is subject to the twenty year patent term provisions of 35 U.S.C. 154(a)(2).

[21] Appl. No.: 08/719,973

[22] Filed: Sep. 24, 1996

[30] Foreign Application Priority Data

Sep. 26, 1996 [FI] Finland ..................................... 954561

[51] Int. Cl.⁶ .................................................... B29C 33/44
[52] U.S. Cl. ...................... 425/556; 264/334; 425/403.1; 425/436 R; 425/444
[58] Field of Search ..................................... 425/554, 556, 425/444, 403.1, 436 R, 436 RM; 264/334

[56] References Cited

U.S. PATENT DOCUMENTS

| | | | |
|---|---|---|---|
| 1,911,119 | 5/1933 | Ingle . | |
| 3,072,240 | 1/1963 | Allgeyer | 198/468.3 |
| 4,295,815 | 10/1981 | Eltvedt | 425/556 |
| 4,781,571 | 11/1988 | Heindl | 425/556 |
| 4,809,425 | 3/1989 | Monforte . | |
| 4,915,611 | 4/1990 | Brown | 425/556 |
| 5,037,597 | 8/1991 | McGinley et al. | 264/334 |
| 5,527,173 | 6/1996 | Miller et al. | 425/556 |

FOREIGN PATENT DOCUMENTS

| | | |
|---|---|---|
| 03262620 | 11/1991 | Japan . |
| 2204267 | 11/1988 | United Kingdom . |

*Primary Examiner*—Patrick Ryan
*Assistant Examiner*—Joseph Leyson
*Attorney, Agent, or Firm*—Merchant, Gould, Smith, Edell, Welter & Schmidt, P.A.

[57] ABSTRACT

The invention relates to an apparatus for moulding plastic products (31'–36'), said apparatus comprising at least two plastic moulding machines (1', 2') each of which comprises a robot (7'–8') for transferring a moulded product (31', 32') from the moulding machine onto a conveyor belt (30'). In order to significantly facilitate and expedite quality inspection and thus also to allow any quality defects to be rapidly corrected, and in order to considerably simplify the transport of the products and the structure of the apparatus, said at least two moulding machines (1', 2') are mounted along a common conveyor belt (30') substantially successively on the same side of the belt, whereby their robots (7', 8') are arranged to place the moulded products (31', 32') at different points over the width of the belt.

5 Claims, 1 Drawing Sheet

APPARATUS FOR MOULDING PLASTIC PRODUCTS

BACKGROUND OF THE INVENTION

The invention relates to an apparatus for moulding plastic products, said apparatus comprising at least two plastic moulding machines each of which comprises a robot for transferring a moulded product from the moulding machine onto a conveyor belt.

Apparatuses of this kind are well known. Moulding machines are typically injection moulding machines. They are used, for example, for moulding parts of plastic enclosures. Each injection moulding machine is typically used for moulding one type of products, e.g. the bottom or the cover of a plastic enclosure; after the moulding, the parts are combined to form a plastic enclosure.

Moulded products must satisfy certain quality criteria—often rather strict ones—as regards the surface, for example. The quality of products can often be quite easily determined on the basis of ocular assessment when the products are on the conveyor belt to which they are ejected from the injection moulding machine. Since there are several injection moulding machines located in different parts of the factory hall, the person responsible for quality inspection must go from one machine to another; this is because it is not sensible to have different persons inspecting the quality of products produced by the different injection moulding machines. In practice, the person responsible for quality inspection has to "run" from one machine to another. Another factor that makes it more difficult to do the job rationally is that the moulding time, i.e. the time it takes to manufacture a product, is different at the different injection moulding machines: one machine may use e.g. two seconds for the manufacture of a product, another one may use eight seconds, yet another one needs nine seconds, etc. On account of this, the person responsible for quality inspection must go to the different injection moulding machines at different intervals, depending on the machine and the product.

On account of the arrangement described above, a defect in the quality of a product is detected at a relatively late stage. An injection moulding machine may mould a large number of defective products before the defect is detected and the machine is stopped so that the necessary steps can be taken to correct the defect.

Another problem associated with known apparatuses comprising several moulding machines is removing products from the machines and transporting them for further treatment or packaging. This requires that either a motor-driven forklift or a hand pallet truck is used for collecting the moulded products, which are normally piled on a pallet, separately from each moulding machine. When there are several injection moulding machines located in different parts of the factory hall, the truck has to travel relatively long distances, which not only consumes time and energy but also increases the risk of accidents.

Yet another problem with apparatuses comprising several moulding machines is that they take up a lot of floor area in a factory hall. It has not been possible to mount the machines close to each other, since narrow passages between the machines would complicate the transport of moulded products with a forklift.

SUMMARY OF THE INVENTION

The object of the present invention is to obviate the problems described above. According to the invention, this can be achieved with an apparatus for moulding plastic products, said apparatus comprising at least two plastic moulding machines each of which comprises a robot for transferring a moulded product from the moulding machine onto a conveyor belt, said at least two moulding machines being mounted along a common conveyor belt substantially successively on the same side of the belt, whereby their robots are arranged to place the moulded products at different points over the width of the belt. There are preferably a plurality of moulding machines mounted in succession along the belt, which renders the invention particularly advantageous.

The present invention is based on the idea of mounting a plurality of moulding machines in succession along a common conveyor belt so that they eject the moulded products onto the same belt. So far it has been thought that such an arrangement cannot work in practice in the plastics industries, because different products and moulding machines have different moulding times: if several moulding machines with different moulding times were mounted in succession, the products would be in disorder and on top of each other at some points of the conveyor belt. According to the invention, it has been surprisingly discovered that moulding machines with different moulding times can be mounted in succession without any problems if separate zones are reserved for the different products in the transverse direction of the conveyor belt. To this end, the common conveyor belt is made so wide that a number of product types corresponding to the number of moulding machines can be ejected thereto without any danger of adjacent products coming into contact with each other.

The most significant advantages of the present invention are that it facilitates and expedites quality inspection considerably, whereby any defects in quality can be more rapidly corrected, and that the transport of the products becomes considerably less complicated and more economical at the same time that the security is improved. In addition, the apparatus is less complicated in structure and less expensive than known apparatuses, since several conveyor belts are not needed.

BRIEF DESCRIPTION OF THE DRAWINGS

In the following, the invention will be described in greater detail with reference to the accompanying drawing, in which.

DETAILED DESCRIPTION OF THE INVENTION

Figure 1:
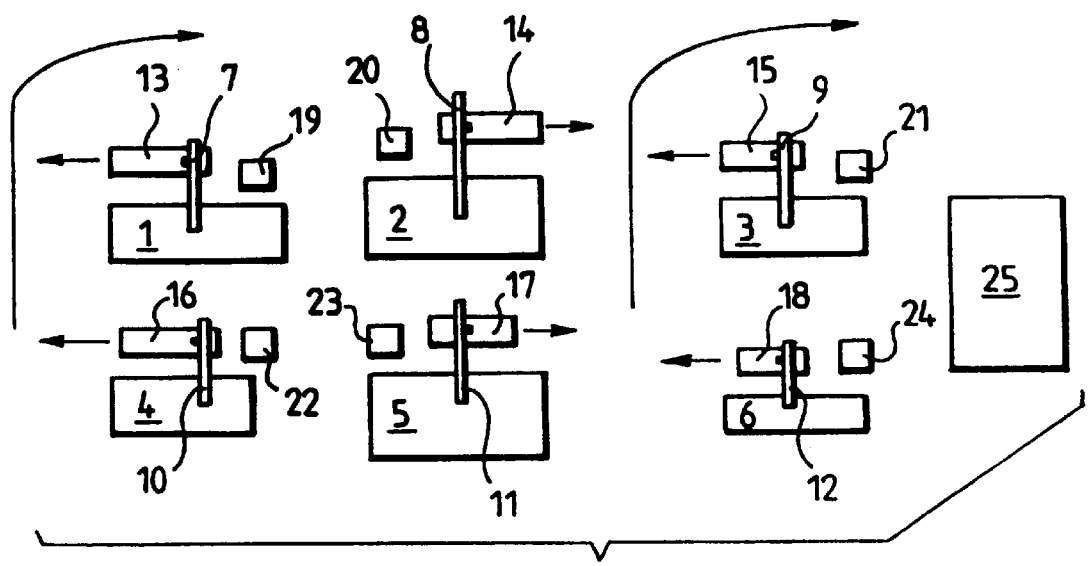
FIG. 1 shows an apparatus of the prior art.

The apparatus according to FIG. 1 comprises six injection moulding machines 1 to 6 for moulding components of plastic enclosures. Each of the machines 1 to 6 manufactures a different plastic product. Each moulding machine 1 to 6 comprises a robot 7 to 12 for transferring the moulded product onto the conveyor belt 13 to 18. Reference numerals 19 to 24 indicate the position of the machine operator.

The products are removed from the belts 13 to 18 in the direction of the arrows. The person responsible for quality inspection goes to each belt 13 to 18 so as to detect any defects in quality. It is usually impossible for him to follow any predetermined route from one moulding machine to another. He may go, for instance, from machine 1 to machine 2, from machine 2 to machine 3, from machine 3 to machine 6, from machine 6 to machine 10, from machine 10 to machine 11, from machine 11 to machine 1. However, this order cannot remain unchanged for several reasons: interruption in the production of some moulding machine(s), different moulding times, etc. If the person responsible for quality inspection follows the above-mentioned route, and a defect occurs in the production of moulding machine 2 soon after he has inspected the quality of the products of machine 2, he will not return to machine 2 until after he has inspected the quality of the products of machines 3, 6, 10, 11 and 1. The delay may be rather long, in which case moulding machine 2 produces a large number of defective products until it is stopped, whereafter the detected defect can be corrected.

The products supplied from the belts are piled on separate pallets (not shown), from which they are transported to a further treatment station 25 as shown by the curved arrows, or directly into storage (not shown).

The layout of FIG. 1 shows that there must be a sufficiently wide passage for a forklift between moulding machines 2 and 3, and 5 and 6.

Figure 2:
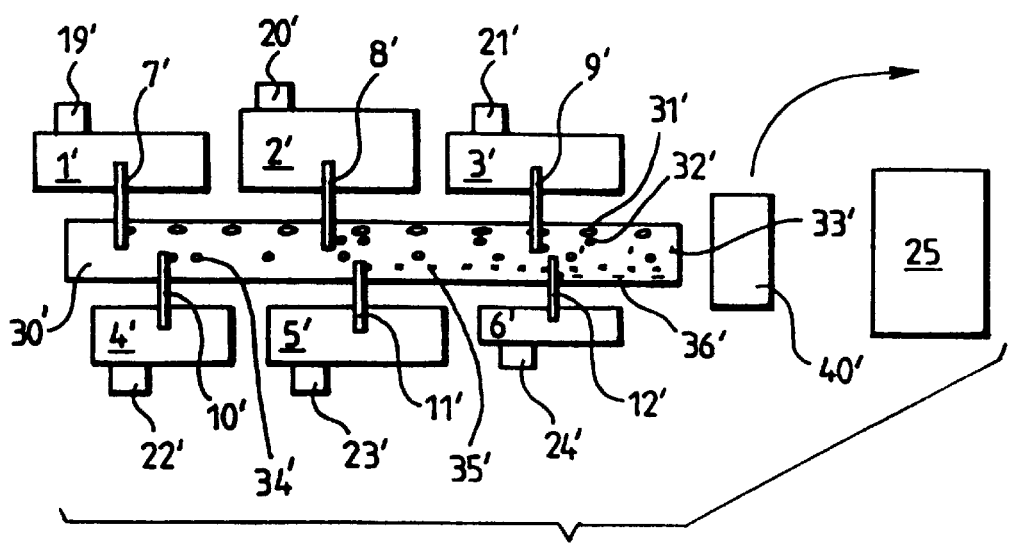
FIG. 2 shows an apparatus of the invention.

FIG. 2 shows an apparatus of the invention. The apparatus produces the same products as the apparatus of FIG. 1. For reasons of simplicity and clarity, the reference numerals in FIG. 2 are similar to those in FIG. 1.

In FIG. 2, the moulding machines 1' to 6' are arranged on both sides of a common conveyor belt 30'. Moulding machines 1' to 3', mounted in succession on one side of the belt 30', are arranged to eject their products 31' to 33' to different points over the width of the belt. The same applies to moulding machines 4' to 6', and thus the belt can be considered to be divided into six zones. In the case of FIG. 2, the robot 7' of moulding machine 1' ejects its product 31' to one edge of the belt 30'; the robot 8' of moulding machine 2' ejects its product 32', whose moulding time on the basis of products 31', 32' is twice as long as that of product 31', to belt zone 30', which is adjacent to the zone reserved for product 31'; the robot 9' of moulding machine 3' ejects its product 33' to a zone which is close to the centre line of the belt 30'. Correspondingly, the robot 10' of moulding machine 4' ejects its product 34' to a zone which is close to the centre line of the belt 30', but on the opposite side thereof to the zone reserved for product 33'. The robot 12' of moulding machine 6' ejects its product 36' to the other edge of the belt 30'; the robot 11' of moulding machine 5' ejects its product 35' to a zone which is adjacent to the zone reserved for product 36'.

It can be seen from FIG. 2 that all the products 31' to 36' have different moulding times, but still they have a common conveyor belt 30'. It is therefore very easy for the person responsible for quality inspection to monitor the quality of all products 31' to 36' on the belt 30' from an inspection station 40', although the number of products per a unit of time varies. If the person detects a defect in product 32', for example, he is able to inform the operator of moulding machine 2' of it very quickly so that the defect in moulding machine 2' can be corrected. In addition to inspecting the quality, the person responsible for quality inspection can also sort the different products into different piles.

The arrangement of FIG. 2 allows the products to be further transported with a forklift from the inspection and sorting station 40' e.g. to a further treatment station 25 or into storage (not shown) by the most direct route; the forklift does not have to travel from one moulding machine to another.

The moulding machines of FIGS. 1 and 2 are injection moulding machines, but it is also conceivable to employ other types of plastic moulding machines.

In the above, the invention has been described only by means of an example. It will be clear to one skilled in the art that in its details the apparatus of the invention can differ to a great extent from the one shown in FIG. 2. For example, the number of the moulding machines may thus be different, and the machines may be located either on both sides or on only one side of the belt 30'.

We claim:

1. An apparatus for moulding plastic products, said apparatus comprising:

a common conveyor belt;

at least two separate and independent plastic moulding machines, each moulding machine having different moulding times and including a robot for transferring a moulded product from the moulding machine onto the common conveyor belt, said at least two moulding machines being mounted substantially successively on a same side of the common conveyor belt, said robots being arranged to place the moulded products at different rates and at different respective first and second positions across the common conveyor belt.

2. An apparatus according to claim 1 further comprising a third moulding machine, having a third robot and being mounted on a side of the common conveyor belt opposite said at least two moulding machines, the third robot being arranged to eject a product moulded in the third moulding machine to a third position across the common conveyor belt, the third position being different from the first and second positions.

3. An apparatus according to claim 2 further comprising a fourth moulding machine having a fourth robot and being mounted substantially after said third moulding machine in a longitudinal direction of the common conveyor belt, the fourth robot being arranged to eject a product moulded in the fourth moulding machine to a fourth position across the common conveyor belt, the fourth position being different from the first, second and third positions.

4. An apparatus according to claim 1, wherein the moulding machines are injection moulding machines.

5. An apparatus for moulding plastic products comprising:

a common conveyor belt;

at least two separate and independent plastic moulding machines, each moulding machine having different moulding times and including a robot for transferring a moulded product from the moulding machine onto the common conveyor belt, said at least two moulding machines being mounted on opposite sides of the common conveyor belt, said robots being arranged to place the moulded products at different rates and at different respective first and second positions across the common conveyor belt.

* * * * *

UNITED STATES PATENT AND TRADEMARK OFFICE
CERTIFICATE OF CORRECTION

PATENT NO. : 5,912,028
DATED : June 15, 1999
INVENTOR(S) : Airas et al.

It is certified that error appears in the above-identified patent and that said Letters Patent is hereby corrected as shown below:

<u>Title page,</u>
In the left column, in international identification number [30] please replace "Sep. 26, 1996" with -- Sep. 26, 1995 --.

Signed and Sealed this

Second Day of April, 2002

Attest:

JAMES E. ROGAN
*Attesting Officer*  *Director of the United States Patent and Trademark Office*